(12) United States Patent
James

(10) Patent No.: US 12,051,335 B2
(45) Date of Patent: Jul. 30, 2024

(54) OPTIMIZING AIRCRAFT PATH PLANNING

(71) Applicant: NOBLIS, INC., Reston, VA (US)

(72) Inventor: Scott James, Arlington, VA (US)

(73) Assignee: NOBLIS, INC., Reston, VA (US)

( * ) Notice: Subject to any disclaimer, the term of this patent is extended or adjusted under 35 U.S.C. 154(b) by 1201 days.

(21) Appl. No.: 16/720,906

(22) Filed: Dec. 19, 2019

(65) Prior Publication Data

US 2020/0380877 A1 Dec. 3, 2020

Related U.S. Application Data

(60) Provisional application No. 62/853,607, filed on May 28, 2019.

(51) Int. Cl.
| | |
|---|---|
| *G06G 7/70* | (2006.01) |
| *G06F 17/11* | (2006.01) |
| *G06N 10/00* | (2022.01) |
| *G08G 5/00* | (2006.01) |

(52) U.S. Cl.
CPC ........ *G08G 5/0034* (2013.01); *G06F 17/11* (2013.01); *G06N 10/00* (2019.01)

(58) Field of Classification Search
CPC ......... G01S 7/4817; G01S 7/483; G01S 17/10
See application file for complete search history.

(56) References Cited

U.S. PATENT DOCUMENTS

| | | | | |
|---|---|---|---|---|
| 8,868,328 B1* | 10/2014 | Estkowski | ............ | G08G 5/045 |
| | | | | 701/301 |
| 10,699,587 B2* | 6/2020 | Hvezda | ................ | G08G 5/0043 |
| 2012/0191333 A1* | 7/2012 | Sawhill | ................ | G08G 5/0052 |
| | | | | 701/122 |
| 2019/0080255 A1* | 3/2019 | Allen | ...................... | G06N 10/00 |
| 2019/0340934 A1* | 11/2019 | Villa | ....................... | G01C 21/20 |

OTHER PUBLICATIONS

"Applications—D-Wave Systems," located at https://web.archive.org/web/20190414143012/hhttps://www.dwavesys.com/quantum-computing/applications archived on Apr. 14, 2019 (13 pages).

(Continued)

*Primary Examiner* — Adam M Alharbi
(74) *Attorney, Agent, or Firm* — Morrison & Foerster LLP

(57) ABSTRACT

Disclosed herein are systems and methods for optimizing air traffic control managing using a Quantum Annealing-based iterative path planning technique and algorithm that involves both classical and quantum computation components. The classical component can calculate the distances between aircraft and the target destination from a set of new, possible properties, such as aircraft location. The quantum component can select from the new, possible properties to minimize the distance of the aircraft to the target destination while ensuring adequate separation between aircraft. The algorithm can utilize qubits to represent maneuverability options for aircraft. The maneuverability options may be partitioned into a set of multiple qubits per aircraft. Each set may include a plurality of qubits that are representative of the sub options. The algorithm can utilize Quadratic Unconstrained Boolean Optimization (QUBO) to find the lowest cost-energy maneuverability option.

20 Claims, 7 Drawing Sheets

(3 of 7 Drawing Sheet(s) Filed in Color)

(56) References Cited

OTHER PUBLICATIONS

Material presented at 2018 NSF-CBMS Conference on Computational Methods in Optimal Control, Jul. 23-27, 2018, Jackson, MS located at https://web.archive.org/web/20180801054331/http://www.siue.edu/~juliu/cbms18/ archived on Aug. 1, 2018 (847 pages).
"D-Wave Systems—Qbsolv," located at https://web.archive.org/web/20190521130256/https://github.com/dwavesystems/qbsolv archived on May 21, 2019 (4 pages).
Blondel et al. (2000). "A Survey of Computational Complexity Results in Systems and Control," Automatica 36: 1249-1274.
Chakrabarti et al. (2007). "Computational Complexity of Quantum Optimal Control Landscapes," Princeton University, pp. 1-8.
Compostella. "Quantum Computing at Volkswagen: Traffic Flow Optimization Using the D-Wave Quantum Annealer," D-Wave Users Group Meeting, Sep. 27, 2017, National Harbor, Maryland; 23 pages.
Martonak et al. (Nov. 10, 2004). "Quantum Annealing of The Traveling Salesman Problem," Phys. Rev. E 70(5): 1-5.
Rieffel et al. "Parametrized Families of Hard Planning Problems from Phase Transitions," Proceedings of the 28th AAAI Conference on Artificial Intelligence, Jul. 27-31, 2014; Quebec City, Quebec, Canada; pp. 2337-2343.
Rieffel et al. (Jul. 10, 2014). "A Case Study in Programming a Quantum Annealer for Hard Operational Planning Problems," Quantum Information Processing 14; pp. 1-19.
Stollenwerk et al. (Nov. 13, 2017). "Quantum Annealing Applied to De-Conflicting Optimal Trajectories for Air Traffic Management," IEEE Transactions on Intelligent Transportation Systems, pp. 1-13.

\* cited by examiner

OPTIMIZING AIRCRAFT PATH PLANNING

CROSS-REFERENCE TO RELATED APPLICATIONS

This application claims the benefit of U.S. Provisional Application No. 62/853,607, filed on May 28, 2019, the entire contents of which are incorporated herein by reference and for all purposes.

FIELD

This relates generally to aircraft control, and more specifically to systems and methods for optimizing aircraft control using classical and quantum computing systems.

BACKGROUND

One of the most critical and computationally complex operations in aircraft control is path planning. Path planning involves temporospatial operations such as rescheduling, holding, and interleaving flights and the complexity of these temporospatial operations rises rapidly with the number of aircraft involved. Beyond conventional aircraft, the rapid expansion of Unmanned Aircraft Vehicles (UAV) into the common airspace further drives the need for an automated approach to aviation path planning.

SUMMARY

As described above, the complexity of aircraft path planning rises rapidly with increases in the number of aircraft involved. At a given instance in time, only one aircraft can utilize a particular portion of a path (e.g., an airport runway), and adjacent paths must be spatially separated by a certain distance to avoid collisions. In some embodiments, the number of paths within a certain proximity may be limited. For example, each airport has a limited number of runways that aircraft can utilize at a given time. Adverse weather conditions and unplanned changes in flight schedules can further complicate the problem by causing delays and creating more stringent requirements, such increasing the distance between aircraft. Aircraft path planning may require significant temporospatial route modifications. For example, multiple aircraft attempting to utilize the same path simultaneously may create holding patterns. Only one aircraft may be able to utilize a path at a time, which may force other aircraft off their previously intended path (e.g., trajectory). The other aircraft may reattempt to utilize the path one or more times.

Aircraft path planning in accordance with the principles above may be subject to several limitations and drawbacks. For example, the increase in number of aircraft attempting to utilize a common path can lead to congestion and increased conflicts. One way to handle such congestion and conflicts can be to add time delays to one or more portions of an aircraft schedule, but doing so may lead to cascading delays, increased air pollution, and added costs.

The aircraft path planning problem may be addressed using a number of mathematical methods that seek to optimize the management of aircraft paths. These methods include, for example, Quadratic Unconstrained Boolean Optimization (QUBO), Undirected Hamiltonian Path formulation, Graph Coloring formulation, and ad-hoc traveling salesman problem (TSP). QUBO can operate by creating a conflict graph where nodes represent possible paths and edges between nodes represent conflicts. Conflicts may be avoided by introducing extra delays. Along with QUBO conflict-graph techniques, the Undirected Hamiltonian Path formulation, and the Graph Coloring formulation may consider generalized planning problems such as navigation planning and schedule planning. However, such systems may lead to a limited number of maneuverability options and may have reduced performance such as added delays to portions of a schedule, residual excess length, and the like.

These approaches may be framed as:

$$x_{k+1} - x_k = f(x_k, u_k) \tag{1}$$

where u is a variable that represents the maneuverability options and x is a variable that represents the aircraft properties (e.g., dynamics). The cost is stated as follows:

$$|x_K^T - \text{destination}| + \sum_{k=0}^{K} Q(x_k, u_k) \tag{2}$$

where destination is a variable that represents one or more portions of the path (e.g., the location of a destination airport) and Q represents a symmetric matrix.

As shown in the above Expressions (1)-(2), the final distance-to-target is represented as a separate term in the optimal cost, and maneuverability options are optimized over all iterations. Such separation of the final distance-to-target term and a large number of iterations may lead to reduced optimality and a large number of computations. Additionally, as shown in Expression (1), the aircraft properties (e.g., dynamics) are determined explicitly by f. Such explicit determination may lead to a restricted number of individual maneuverability options that can compromise optimality and reduce efficiency of the system.

Accordingly, there is a need for improved systems and methods for managing aircraft control, and specifically for a path planning algorithm to be used in areas where aircraft (e.g., conventional aircraft, UAV, etc.) are in close proximity. Disclosed herein are systems and methods for optimizing aircraft control that may address one or more of the problems explained above.

The systems and methods disclosed herein may leverage quantum annealing to enable an iterative path planning technique and algorithm that involves both classical and quantum computation components. The classical component can use one or more processors of a classical computing system to calculate the distances between aircraft and possible paths for aircraft from a set of new, possible properties, such as aircraft location. The quantum component can use one or more processors of a quantum computing system to select from the new, possible properties to minimize the distance of the aircraft to a target/destination (e.g., the location of the destination) while ensuring adequate separation between aircraft. In some embodiments, one or more minimizations performed during execution of the techniques/computations disclosed herein may be performed in fewer time-steps (e.g., in a single time step) by a quantum computing system than is possible in a classical computer implementation.

By using both classical and quantum computation components, the flight trajectories for multiple aircraft flying to a common destination (or multiple destinations) may be optimized while the separation distance between the aircraft may be maintained. The algorithm can utilize qubits to represent maneuverability options for aircraft. The maneuverability options may be partitioned into a set of multiple qubits per aircraft. Each set may include a plurality of qubits that are representative of the maneuverability options.

The algorithm can utilize QUBO to find the lowest cost-energy maneuverability option (e.g., from among multiple maneuverability options). By increasing the number of maneuverability options, conflicts may be reduced and delays to schedules (e.g., delays to or to one or more segments of a schedule, such as delays in clearance for landing) may be minimized.

In some embodiments, the optimization may occur within the context of fewer than all (e.g., a single) iterations. By optimizing over fewer than all iterations, the number of computations may be reduced. In some embodiments, the optimization results may be enhanced by integrating the distance-to-target variable directly within the Q matrix. For example, the distance-to-target may be taken into account at each iteration, rather than as part of an optimization including the entire path. The techniques disclosed herein may differ in this way from, for instance, a discrete graph approach.

Additionally or alternatively, in some embodiments, aircraft properties (e.g., dynamics) may be determined implicitly in the quantum formulation. In some instances, the algorithm can place restrictions to the individual maneuverability options, also referred to as sub options. In some embodiments, the number of qubits may be the limiter for the granularity of maneuvers.

An exemplary quantum-computing aircraft path planning system comprises a classical computing system and a quantum computing system communicatively coupled to one another, the classical computing system configured to: receive state data from a plurality of aircraft, the state data specifying position data and heading data for each of the plurality of aircraft; generate one or more respective first groups of mutually exclusive maneuverability options for each of the plurality of aircraft; and the quantum computing system configured to generate a solution representing, for each of the one or more respective first groups of mutually exclusive maneuverability options for each of the plurality of aircraft, a respective lowest-cost first maneuverability option for the respective aircraft.

In some embodiments, the classical computing system is configured to: calculate, based on the state data, a first respective distance to a target for each of the plurality of aircraft; and calculate, based on the state data, a first respective inter-aircraft repulsion for each of the plurality of aircraft, wherein the one or more respective first groups of mutually exclusive maneuverability options are generated based on the first respective distance to the target for each of the plurality of aircraft and based on the inter-aircraft repulsion for each of the plurality of aircraft.

In some embodiments, the classical computing system is configured to: calculate, based at least in part on the respective lowest-cost first maneuverability option for each of the plurality of aircraft, a second respective distance to target for each of the plurality of aircraft and a second respective inter-craft repulsion for each of the plurality of aircraft, wherein the second respective distances to target and second respective inter-craft repulsions represent a subsequent time-step with respect to the first respective distance to target and first respective inter-craft repulsion; and generate one or more respective second groups of mutually exclusive maneuverability options for each of the plurality of respective aircraft, wherein the one or more respective second groups of mutually exclusive maneuverability options are generated based on the second respective distance to the target for each of the plurality of aircraft and based on the second respective inter-aircraft repulsion for each of the plurality of aircraft; and the quantum computing system is configured to generate a second solution representing, for each of the one or more respective second groups of mutually exclusive maneuverability options for each of the plurality of aircraft, a respective lowest-cost second maneuverability option for the respective aircraft.

In some embodiments, the one or more respective first groups of mutually exclusive maneuverability options include data representing a quadratic unconstrained binary optimization, the data representing the quadratic unconstrained binary optimization including a plurality of matrices.

In some embodiments, the data representing the quadratic unconstrained binary optimization comprises a plurality of total distances-to-target.

In some embodiments, each of the plurality of total distances-to-target is equal to a sum of a distance-to-target for each of the plurality of aircraft for a given group of mutually exclusive qubits.

In some embodiments, the data representing the quadratic unconstrained binary optimization comprises a plurality of total intercraft-repulsion costs.

In some embodiments, each of the plurality of total intercraft-repulsion costs is equal to a sum of an intercraft repulsion cost for each of the plurality of aircraft for a given group of mutually exclusive qubits.

In some embodiments, the path planning system is configured to transmit a control signal, from a control system to one or more of the plurality of aircraft, the control signal comprising instructions for navigation of the one or more of the plurality of aircraft based on the first solution.

In some embodiments, the classical computing system is configured to transmit the one or more groups of mutually exclusive maneuverability options to the quantum computing system, and the quantum computing system is configured to transmit the generated solution to the classical computing system.

In some embodiments, the one or more respective first groups of maneuverability options represent one or more of: a change in direction, a change in speed, and a change in altitude.

In some embodiments, the generating the one or more respective first groups of maneuverability options comprises: determining a zone for the respective aircraft based on the state data; and generating the one or more groups of respective first maneuverability options in accordance with one or more maneuverability option constraints applicable to the determined zone.

An exemplary method for optimizing aircraft control comprises: communicatively coupling a classing computing system and a quantum computing system to one another; at the classical computing system: receiving state data from a plurality of aircraft, the state data specifying position data and heading data for each of the plurality of aircraft; generating one or more respective first groups of mutually exclusive maneuverability options for each of the plurality of aircraft; at the quantum computing system, generating a first solution representing, for each of the one or more respective first groups of mutually exclusive maneuverability options for each of the plurality of aircraft, a respective lowest-cost first maneuverability option for the respective aircraft.

In some embodiments, the method further comprises: at the classical computing system: calculating, based at least in part on the respective lowest-cost first maneuverability option for each of the plurality of aircraft, a second respective distance to target for each of the plurality of aircraft and a second respective inter-craft repulsion for each of the plurality of aircraft, wherein the second respective distances to target and second respective inter-craft repulsions represent a subsequent time-step with respect to the first respective distance to target and first respective inter-craft repulsion; and generating one or more respective second groups of mutually exclusive maneuverability options for each of the plurality of respective aircraft, wherein the one or more respective second groups of mutually exclusive maneuverability options are generated based on the second respective distance to the target for each of the plurality of aircraft and based on the second respective inter-aircraft repulsion for each of the plurality of aircraft; and at the quantum computing system, generating a second solution representing, for each of the one or more respective second groups of mutually exclusive maneuverability options for each of the plurality of aircraft, a respective lowest-cost second maneuverability option for the respective aircraft.

In some embodiments, the one or more respective first groups of mutually exclusive maneuverability options include data representing a quadratic unconstrained binary optimization, the data representing the quadratic unconstrained binary optimization including a plurality of matrices.

In some embodiments, the method further comprises: at the classical computing system, transmitting the one or more groups of mutually exclusive maneuverability options to the quantum computing system; and at the quantum computing system, transmitting the generated solution to the classical computing system.

In some embodiments, the one or more respective first groups of maneuverability options represent one or more of: a change in direction, a change in speed, and a change in altitude.

In some embodiments, the generating the one or more groups of maneuverability options comprises: determining a zone for the respective aircraft based on the state data; and generating the one or more groups of respective first maneuverability options in accordance with one or more maneuverability option constraints applicable to the respective aircraft within the determined zone.

An exemplary non-transitory computer-readable storage medium for optimizing aircraft control, wherein the storage medium stores instructions that, when executed by one or more processors of a quantum-computing aircraft path planning system, cause the quantum-computing aircraft path planning system to: communicatively couple a classical computing and a quantum computing system to one another; at the classical computing system: receive state data from a plurality of aircraft, the state data specifying position data and heading data for each of the plurality of aircraft; generate one or more respective first groups of mutually exclusive maneuverability options for each of the plurality of aircraft; at the quantum computing system, generate a first solution representing, for each of the one or more respective first groups of mutually exclusive maneuverability options for each of the plurality of aircraft, a respective lowest-cost first maneuverability option for the respective aircraft.

BRIEF DESCRIPTION OF THE FIGURES

The patent or application file contains at least one drawing executed in color. Copies of this patent or patent application publication with color drawings will be provided by the office upon request and payment of the necessary fee.

DETAILED DESCRIPTION

Described herein are exemplary embodiments of a system and method for optimizing aircraft path planning, which may address the problems and shortcomings of known air traffic control systems and methods described above.

Exemplary System

Figure 1:
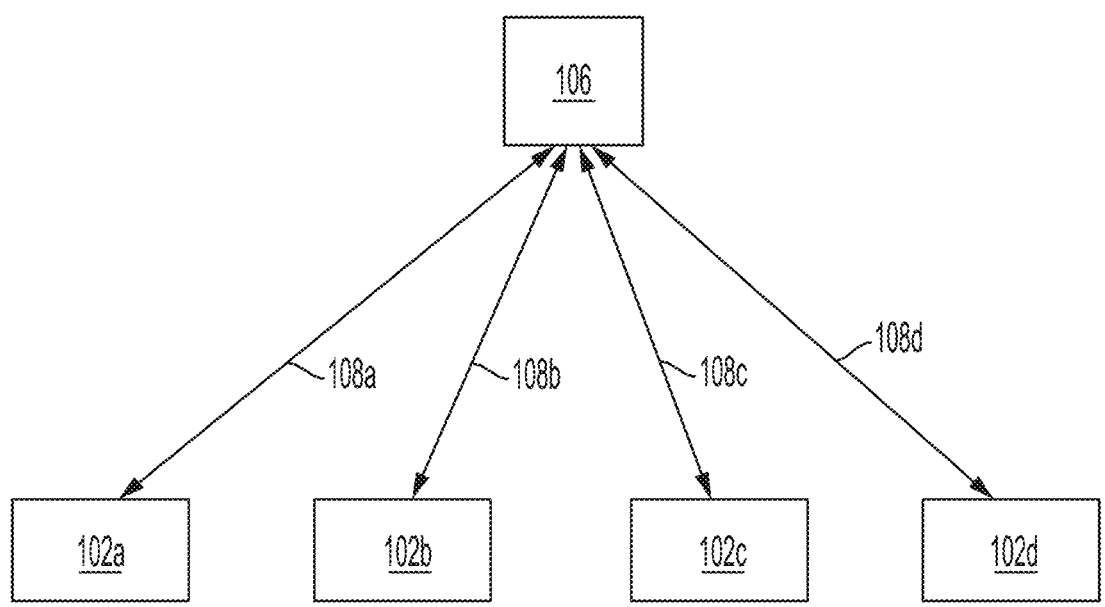
FIG. 1 depicts an exemplary system for optimizing aircraft path planning, in accordance with some embodiments.

FIG. 1 depicts an exemplary system for optimizing aircraft path planning, in accordance with some embodiments. As shown, system 100 may include aircraft 102a-d associated with a path planning system 106 and a common target (e.g., a destination airport) for said aircrafts (not shown). Aircraft 102a-d may be conventional aircraft, Unmanned Aircraft Vehicles (UAV), or a combination thereof. In the example shown in FIG. 1, there are four aircraft 102a-d associated with one path planning system 106. In some embodiments, the four aircraft 102a-d may be associated with a common target/destination and/or a common path. The term "common target" will be used herein, but it should be understood that system 100 may be configured not merely to cause aircraft 102a-d to arrive at the common target, but may further be configured to cause aircraft 102a-d to arrive at said common target with a particular heading, e.g., by traveling along a particular common path in a particular direction, for example as may be required for landing on an airport runway. The common target can include, but is not limited to, a set of runways of the same destination airport. However, in some embodiments, system 100 may include any number of aircraft greater than four. In some embodiments, system 100 may include tens or hundreds or more individual aircraft. In some embodiments, the common target may include both the intended locations that aircraft will travel and the area(s) surrounding the intended locations.

Although the figure shows one path planning system 106, in some embodiments, the system 100 may include any number of path planning systems greater than one. Additionally, the path planning system 106 may be located anywhere relative to the aircraft 102a-d and the common target. Further, the path planning system 106 may be associated with any number of target, paths, airports, and/or the likes.

In some embodiments, path planning system 106 may be provided by a single computing system, by a plurality of computing systems, and/or by a distributed computing system (e.g., a cloud computing system). In some embodiments, path planning system 106 may be provided, in whole or in part, by one or more computing systems (e.g., processors) (e.g., located at an airport or located remotely from an airport, or located onboard an aircraft or located remotely from an aircraft). In some embodiments, the computing system may be a quantum computing system, a hybrid quantum-classical computing system, or may be comprised of one or more computing systems that has access to one or more quantum computing system. For example, the quantum computing system may be a D-Wave computer. In some embodiments, the quantum computing system (e.g., the D-wave computer) may be accessed and controlled remotely for execution of quantum computations by the quantum computing system. In some embodiments, the quantum computing system can be capable of storing and encoding quantum bits and a large number of combinations of states, leading to significantly reduced computation times.

Aircraft 102a-d may include any computerized devices configured to participate in system 100 by using one or more sensors to detect characteristics of the respective aircraft, such as the location (e.g., longitude, latitude, altitude), orientation (e.g., cardinal orientation, heading, pitch, yaw, roll), speed (e.g., air-speed, ground-speed), and/or acceleration (e.g., thrust) of the respective aircraft. In some embodiments, the one or more sensors may be configured to detect characteristics that may include any derivatives (of any order) of any of the characteristics of the respective aircraft listed above. The computerized devices in aircraft 102a-d may be configured to communicate (e.g., transmit and receive data) with a path planning system 106 via one or more transceivers, including to transmit information from the aircraft to control 106 regarding the characteristics of the aircraft. The transceiver(s) may utilize communication protocols in order to transmit and receive control signals 108a-d included in the communicated data to and from the path planning system 106. Each of the computerized devices in the aircraft 102a-d may comprise one or more processors configured to control the sensor(s) and transceivers. The computerized devices in the aircraft 102a-d may also be configured to control navigation (e.g., to control acceleration, deceleration, and steering) of the respective aircraft using information from the respective control signals 108a-d. Exemplary controls may include, but are not limited to, heading (e.g., steering, angle, turning rate), speed, acceleration, and altitude.

Path planning system 106 may include a computerized device configured to participate in system 100 by using one or more transceivers to communicate with the aircraft 102a-d. The transceiver(s) may utilize communication protocols in order to transmit and receive control signals 108a-d to and from, respectively, the aircraft 102a-d. The path planning system 106 may be configured to receive information, such as locations of the aircraft 102a-d to generate the control signals 108a-d. The path planning system 106 may also be configured to store and retrieve information such as aircraft timetables from memory (which may be provided locally or remotely from path planning system 106). Further, the path planning system 106 may be configured to use other information for generating the control signals 108a-d; exemplary information may be from one or more sensors that detect characteristics of the surrounding environment, such as the weather conditions. In some embodiments, the path planning system 106 may be configured to take into account constraints for aircraft dynamics such as cruise speed limitations, turning rate limitations, acceleration limitations, climbing speed limitations, heading limitations, etc. The computerized device of the path planning system 106 may comprise one or more processors configured to generate the control signals 108a-d and may be configured to execute one or more algorithms in order to generate the control signals.

In the example shown in FIG. 1, aircraft 102a-d may be communicating information to and from the path planning system 106. While not shown, other aircraft, other sensors, and other information sources (e.g., another path planning system) may also transmit information to the path planning system 106. As discussed below, path planning system 106 may be configured to perform one or more calculations to optimize flight trajectories (e.g., path planning) for aircraft 102a-d, such that path planning system 106 may transmit information to aircraft 102a-d regarding the optimized flight trajectories.

Optimizing flight trajectories for multiple aircraft flying along a common path and/or to a common target, such as one having an airport as its destination, while maintaining separation between the aircraft may be a path insertion problem that affects a number of aircraft-based technologies that involve areas where aircraft are in close proximity. Exemplary applications can include, but are not limited to, aircraft path planning in high-density traffic areas, such as near airports.

Exemplary Method

Figure 2:
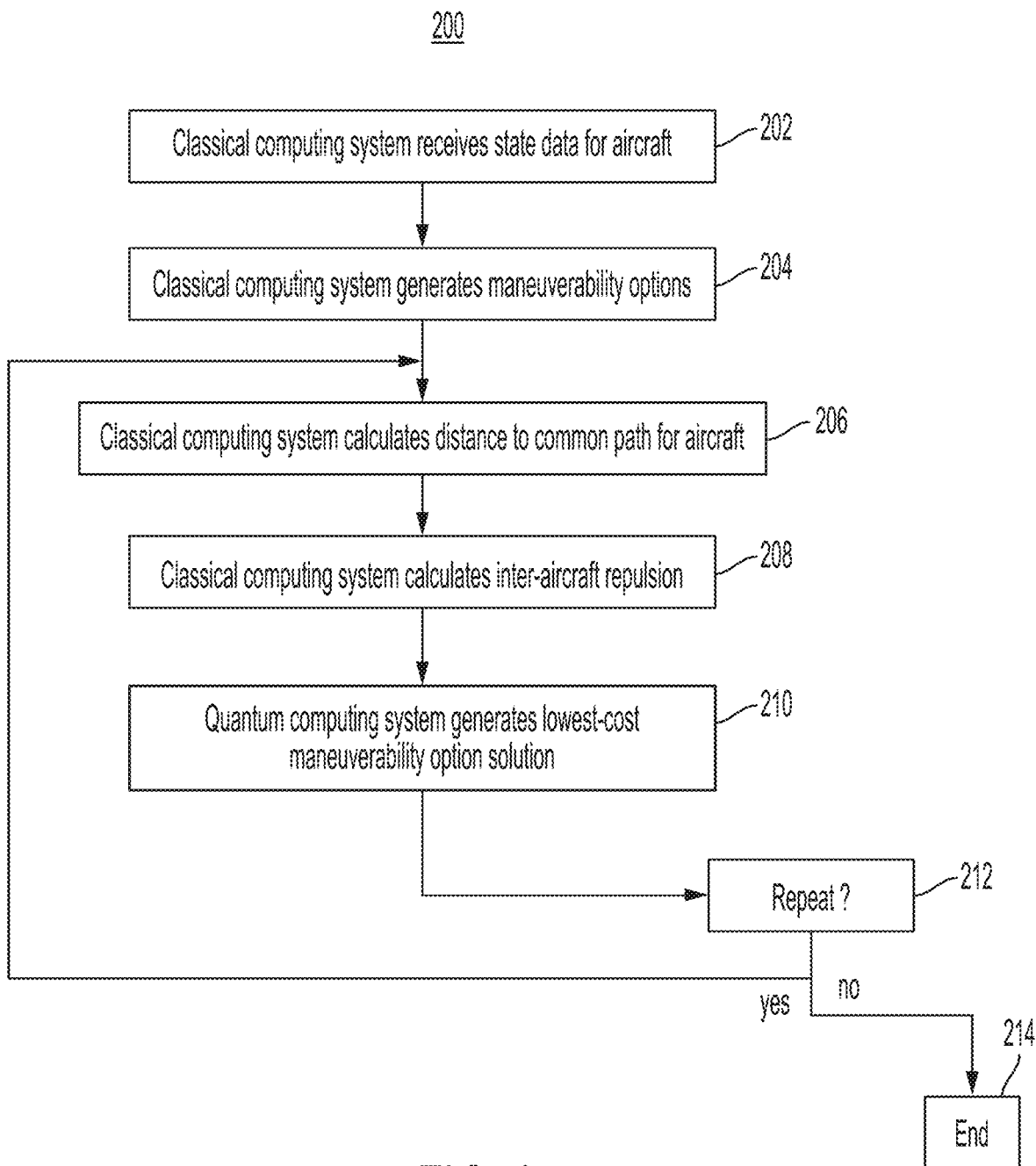
FIG. 2 depicts a flowchart representing an exemplary method for optimizing aircraft path planning, in accordance with some embodiments.

FIG. 2 depicts a flowchart representing an exemplary method 200 for optimizing aircraft path planning, in accordance with some embodiments. In some embodiments, method 200 may be carried out, in whole or in part, by one or more components of a system for optimizing aircraft path planning, such as system 100 described above with respect to FIG. 1. In some embodiments, any one or more of the aspects of method 200 may be combined, in whole or in part, with any one or more of the aspects of FIG. 1, and/or with any one or more of the systems, methods, devices, and/or techniques described elsewhere herein.

As described below, method 200 may achieve optimization of the flight trajectories of multiple aircraft (e.g., aircraft 102a-d) flying along a common path and/or to a common destination/target while maintaining separation between the aircraft. Method 200 may achieve this optimization and may address the path insertion problem that is a well-known aviation problem affecting a number of aircraft-based technologies that involve areas where aircraft are in close proximity.

In some embodiments, in one or more blocks discussed below, the optimization may occur by a single iteration through the blocks of method 200. Additionally or alternatively, the optimization in one or more blocks may occur within the context of multiple (e.g., all) iterations. For example, in some embodiments, the cost function may be minimized over some or all iterations. As described herein, certain problems in air traffic management can be solved using Quantum Annealing techniques. The path insertion problem may viewed loosely as a discrete optimal control problem. The method may comprise: (1) controlling all aircraft 102a-d, (2) having plans to travel along a common path and/or to a common destination/target, (3) using control signals 108a-d, where (4) optimization may occur iteratively in multiple steps.

In some embodiments, method 200 may utilize a Quadratic Unconstrained Binary Optimization (QUBO) approach. The QUBO approach may be suitable for the optimization of air traffic control management because the system may have a limited number of qubits, and the desired solution may be to minimize a quadratic question. The QUBO approach can be framed as:

$$u^T Q(x) u \tag{3}$$

where u may represent vectors of maneuverability options, $u^T$ may represent the transpose of vectors u, and Q(x) may be a matrix that represents aircraft properties (e.g., dynamics). Within a given iteration, the aircraft properties x may be static and thus not variable within the QUBO minimization. In some embodiments, the maneuverability option vectors $u^T$ and u may be represented by qubits and may be variable. In some embodiments, the maneuverability option vector u may include binary values, and the aircraft properties x may be unconstrained values.

In some embodiments, the QUBO approach can be implemented using an algorithm that finds a minimum value from the Expression (3). The algorithm can generate a solution representing a single lowest-cost maneuverability option for the respective aircraft. One example algorithm can be a decomposing solver such as Qbsolv (see https://github.com/dwavesystems/qbsolv). In some embodiments, as discussed above, the quantum computing system may be capable of storing and encoding a large number of combination of states, and the algorithm can generate the solution by splitting the quadratic question.

Each aircraft may be associated with individual maneuverability options, represented by $u_n$. In some embodiments, the set of possible maneuverability options associated with each aircraft may be unique. For example, aircraft 102a may have a unique maneuverability option $u_a$ represented by qubits. For example, the options for an aircraft to turn right or left can be represented by two qubits, the options for an aircraft to speed up or stay the same speed can be represented by an additional two qubits, etc. Maneuverability options for an aircraft may include changes in any aircraft characteristic, such as change in direction, change in speed, change in altitude, change in yaw, change in pitch, change in roll, change in acceleration, and/or change in any derivative (of any order) of any aircraft characteristic including any derivative (of any order) of any of the characteristics listed herein.

At block 202, in some embodiments, the path planning system may receive data related to initial (e.g., current) states of aircraft. Exemplary data may include location (e.g., longitude, latitude, altitude), orientation (e.g., cardinal orientation, heading, pitch, yaw, roll), speed (e.g., air-speed, ground-speed), and/or acceleration (e.g., thrust) of the respective aircraft. Exemplary data may include any derivatives (of any order) of any of the characteristics listed above. Data may also include the distance to aircraft and the distance between aircraft, for example. In some embodiments, data regarding initial (e.g., current) aircraft state(s) may be received one or more times (e.g., iteratively or dynamically) during a path planning aircraft control operation.

In some embodiments, the path planning system may include one or more classical computing systems. The one or more classical computing systems can include one or more processors configured to perform block 202. In some embodiments, the one or more classical computing systems can utilize a High Performance Computing (HPC) cluster. In some embodiments, block 202 for at least two aircraft can be performed in parallel.

At block 204, the maneuverability options $u_n$ may be determined, qubits may be partitioned between each aircraft in the system, and qubits may further be partitioned based on maneuverability options for each aircraft in the system. That is, once the maneuverability options $u_n$ are partitioned, there may be a plurality of sets of qubits for each maneuverability option for each aircraft.

In some embodiments, the system may partition qubits between different aircraft represented by the system. For example, in an embodiment in which a system is being used to model five aircraft, each aircraft may have four respective maneuverability options (e.g., speed up, slow down, turn right, turn left). In this embodiment, each of the five aircraft may thus need four respective qubits, one to be associated with each of the four maneuverability options, for a total of 20 qubits between the five aircraft. The 20 qubits may be partitioned by the system into groups of four, such that the system minimizes qubits on a per-aircraft basis (e.g., therefore determining one or more maneuverability options for each of the different aircraft).

In some embodiments, the qubits may be representative of sub options b, where, e.g., $b \in 1 \ldots B$; B may represent the number of qubits per maneuverability option for a given aircraft. These qubits may determine the possible changes to the directional components of aircraft, such as the heading (angle), speed, and/or altitude of the aircraft. The directional components may represent how aircraft maneuvers in space (e.g., all three dimensions) and time.

In some embodiments, in addition to the partitioning of qubits between different aircraft as discussed above, the system may further subdivide (e.g., sub-partition) qubits for the same aircraft into groups based on specific associated maneuverability options. For example, taking the example above in which each aircraft may speed up or slow down and turn left or turn right, the system may subdivide each aircraft's four qubits into two groups of two, such that the qubit for speeding up is grouped with the qubit for slowing down, and such that the qubit for turning right is grouped with the qubit for turning left. In this way, qubits representing mutually exclusive maneuverability options may be grouped with one another, such that the minimization performed by the system may select only a single qubit representing one of one or more mutually exclusive maneuverability options for each aircraft.

Sub options b for an aircraft n may be represented by the variable $u_{nb}$. In some embodiments, the results of applying sub options $u_{nb}$ to the control $x_n$ may be represented by the variable $x_{nb}$. The total dimension of the QUBO may thus be BN, where N represents the number of aircraft in the system.

It should be noted that the dimension of the control $x_n$ (for instance to store spatial information) may not affect the dimensionality of Q, but may affect the content of Q.

As discussed in more detail below, in some embodiments, one or more qubit exclusivity techniques may be employed to assign different meanings with respect to maneuverability options to one or more qubits. As explained below in more detail, the dimensionality of one or more minimizations executed by the system may depend on the manner in which maneuverability options are mapped onto qubits.

In some embodiments, the one or more processors of the one or more classical computing systems can be configured to perform block 204. In some embodiments, the one or more classical computing systems can utilize a HPC cluster. In some embodiments, block 204 for at least two aircraft can be performed in parallel.

At block 206, in some embodiments, the total distance-to-target, $Q_a$, may be determined. In some embodiments, this determination may be performed in order to allow the system to minimize the distance to the target while maintaining adequate aircraft separation. In some embodiments, distance-to-target $Q_a$ for one or more aircraft in the system may be calculated using embarrassingly parallel computations. In some embodiments, distance-to-target $Q_a$ for one or more aircraft in the system may be calculated using one or more classical computing components of the system.

The total distance-to-target may be represented as:

$$u^T Q_a(x) u := \sum_{n}^{N} \sum_{b}^{B} d(x_{nb}) u_{nb}^2 \quad (4)$$

where d represents the change in distance from the target/destination.

In some embodiments, the system may calculate the resulting distance-to-target for each aircraft resulting from applying each possible maneuverability option (corresponding to the respective qubits of a given set) to the aircraft dynamics. For example, the resulting distance-to-target if an aircraft were to turn left may be calculated, and the resulting distance-to-target if an aircraft were to turn left may be calculated.

As discussed above, the changes to the aircraft dynamics may be governed by the aircraft controls. In some embodiments, the aircraft controls may be selected from one of the maneuverability options. For example, the maneuverability options can include a set of possible new locations for a respective aircraft. Other exemplary maneuverability options can include, but are not limited to, possible aircraft directions and possible aircraft speed. In some embodiments, the system may calculate resulting distance-to-target for each aircraft for each possible maneuverability option, including but not limited to all possible directional options and speed options. As discussed below, the minimization (performed, in some embodiments, by one or more quantum processors of the system) may select one option from one or more sets of mutually exclusive maneuverability options for each aircraft, based on the calculated resulting distance-to-target values for each of the possible maneuverability option.

In some embodiments, the one or more processors of the one or more classical computing systems can be configured to perform block 206. In some embodiments, the one or more classical computing systems can utilize a HPC cluster. In some embodiments, block 206 for at least two aircraft can be performed in parallel.

At block 208, in some embodiments, the path planning system 106 may determine the repulsion $Q_r$ between aircraft. The repulsion may be modeled in different ways; in some embodiments, inter-craft repulsion may be modeled as substantially monotonic and as requiring that a minimum separation distance exists between aircraft. In some embodiments, the repulsion between aircraft may be based on the inverse of the distance between the two aircraft. In some embodiments, a repulsion for an aircraft may drop to zero when an aircraft is sufficiently close to the target/destination (e.g., the aircraft is within a distance threshold of the destination airport, indicating that the aircraft has landed), such that aircraft which have already arrived at the destination path/target do not create repulsion in the model that would prevent other aircraft from also arriving at the target destination/path at a later time.

In some embodiments, determination of repulsion may be performed in order to allow the system to minimize the distance to the target/destination while maintaining adequate aircraft separation. In some embodiments, repulsion $Q_r$ for one or more aircraft in the system may be calculated using parallel computations (e.g., embarrassingly parallel computations). In some embodiments, repulsion $Q_r$ for one or more aircraft in the system may be calculated using one or more classical computing components of the system.

The total intercraft-repulsion cost may be represented as:

$$u^T Q_r(x) u := \sum_{m,n}^{N} \sum_{i,j}^{B} r(x_{ni}, x_{mj}) u_{ni} u_{mj} \quad (5)$$

where r represents the change in repulsion between aircraft.

In some embodiments, the system may calculate the resulting repulsion for each aircraft resulting from applying each possible maneuverability option (corresponding to the respective qubits of a given set) to the aircraft dynamics. For example, the resulting repulsion if an aircraft were to turn left may be calculated, and the resulting repulsion if an aircraft were to turn left may be calculated.

Thus, the intercraft-repulsion cost of each aircraft may be related to the change in repulsion between aircraft resulting from applying each change to the aircraft dynamics. As discussed above, the changes to the aircraft dynamics may be governed by the aircraft controls. In some embodiments, the aircraft controls may be selected from one of the maneuverability options. For example, the maneuverability options can include a set of possible new locations for a respective aircraft. Other exemplary maneuverability options can include, but are not limited to, possible aircraft directions and possible aircraft speed. In some embodiments, the system may calculate resulting repulsions for each aircraft for each possible maneuverability option, including but not limited to all possible directional options and speed options. As discussed below, the minimization (performed, in some embodiments, by one or more quantum processors of the system) may select one option each from one or more sets of mutually exclusive maneuverability options for each aircraft, based on the calculated resulting repulsion values for each of the possible maneuverability options.

In some embodiments, the one or more processors of the one or more classical computing systems can be configured to perform block 208. In some embodiments, the one or more classical computing systems can utilize a HPC cluster. In some embodiments, block 208 for at least two aircraft can be performed in parallel.

At block 210, the QUBO shown below at Expression (6) can be used to model and solve the disclosed optimization problem:

$$u^T(Q_a + Q_r)(x)u \quad (6)$$

In some embodiments, this QUBO (6) can be used to find the lowest cost-energy option for a current time unit, where both distance-to-target and repulsion between aircraft can be considered, thereby selecting new aircraft locations from available options by minimizing the collective distance to the target while maintaining separation from other aircraft. Solving the optimization problem by minimizing the QUBO (6) may be carried out by one or more quantum computing components (e.g., a quantum annealing computing system) of the path planning system 106. In some embodiments, one or more processors of one or more classical computing systems can be configured to perform block 210.

In some embodiments, the process may end with a single iteration, and blocks 202, 204, 206, 208, and 210 may not be repeated. In some embodiments, instead, the process can continue from block 212 directly (e.g., without repeating blocks 202, 204, 206, 208, and 210) to block 214, where the control signals 108 from the determined lowest cost-energy option can be sent from the path planning system 106 to the aircraft 102 such that the aircraft 102 may be manually and/or automatically controlled in accordance with the control signals 108.

In some embodiments, such as in embodiments where multiple iterations are performed, blocks 206, 208, and 210 may be repeated after block 212. In such embodiments, before each iteration (i.e., repeating blocks 206, 208, and 210) is performed, the aircraft dynamics may be updated in accordance with the lowest cost-energy option selected (e.g., updated in accordance with the maneuverability options determined at block 210). Thus, the process may be performed iteratively for a plurality of time-steps, for example until all aircraft in the system have successfully landed at the destination.

In some embodiments, iteration of the process may be governed by a classical computing component of the system; for example, while a quantum computing component may be used to execute the minimization computations, the results of the minimization computations may be transmitted to and/or processed by classical computing components of the system, and the classical computing components of the system may configure new input(s), iteratively, for the quantum computing components to perform a next minimization for a next iteration of the path planning algorithm.

Exemplary Qubit Semantics and Qubit Exclusivity Schema

As mentioned above, in some embodiments, qubits in the system may be associated with a specific aircraft and/or with a specific maneuverability option for a specific aircraft. In some embodiments, maneuverability options (e.g., turn left, turn right, keep the same heading) may be semantically mutually exclusive from one another. In some embodiments, the system may be configured in one or more different manners to choose between two or more mutually exclusive qubit options. Qubit semantics and exclusivity may be used to lower the dimensionality of the QUBO minimization being performed by the system. As explained below, different semantic schemes may be used to assign meaning within the path planning algorithm (e.g., associating different maneuverability options with different qubits) in various different ways. By selecting certain semantic schemes and enforcing exclusivity between certain qubits, the system may be forced to generate a minimization solution that chooses only one qubit from a group of semantically mutually exclusive qubits. As explained below, selecting different semantic schemes and different exclusivity schemes may allow the dimensionality of the minimization problem to be reduced, which may be useful for execution of the minimization problem on quantum computing processors that only have a limited number of qubits available. This reduced dimensionality can enhance the performance of the system by densely mapping meaning into a small number of qubits, thereby allowing the system the ability to implement the algorithm using a greater number of controls, aircraft, etc. without a compromise in efficiency or computational requirements.

In some embodiments, certain subsets of the B control qubits are semantically, mutually exclusive. For example, at each iteration, aircraft may have the options to: (1) keep the same heading (e.g., go straight), (2) turn left (at some fixed angle), or turn right. One way to express the qubit exclusivity can be to create a soft constraint using a weighted identity:

$$\sum_{n=1}^{N}\left(1-\sum_{i=1}^{3}u_{ni}\right)^{2}=0 \quad (7)$$

Another way to configure the system to address qubit exclusivity in this case of three mutually exclusive options is to arrange the costs such that minimization itself chooses a singular qubit. For example, a 2-qubit can be created with the semantics shown in Table 1. A qubit can be used to represent a plurality of maneuverability options.

TABLE 1

Example semantics for a 2-qubit

| Qubit | Maneuverability option |
|---|---|
| 00 | Keep same bearing |
| 10 | Turn left |
| 01 | Turn right |
| 11 | Turn left and turn right |

As discussed above, the lowest energy-cost option can be determined at block 210. In some embodiments, the lowest energy-cost option can include determining the lowest cost of changing direction. The cost of changing direction can be expressed as:

$$d_{ni}:=D(x_{nb},\text{destination})-D(x_{n0},\text{destination}), b\in 1\ldots 2 \quad (8)$$

where $x_{nb}$ represents the results of applying sub options $u_{nb}$ to the control $x_n$, apt represents the location of the target/destination, and $d_{ni}$ represents the cost of changing direction for the aircraft. Specifically, for each aircraft, $x_{n0}$ represents the aircraft continuing with the current heading, $x_{n1}$ represents the aircraft turning left and continuing, and $x_{n2}$ represents the aircraft turning right and continuing.

In Expression (8), the cost has a sign that represents the progress of the aircraft relative to the target. The distance-to-target may be negative if applying a given qubit results in the aircraft getting closer to the target, and the distance-to-target may be positive if applying a given qubit results in the aircraft heading further away from the target. Additionally, the distance-to-target may be zero if a given qubit results in no change with respect to the aircraft's proximity to the target.

As one example, applying Expression (8) to Table 1 may result in Table 2.

TABLE 2

Example cost and associated meaning for a 2-qubit

| Qubit | Qubit Meaning | Distance-to-target | Meaning |
|---|---|---|---|
| 00 | Keep same bearing | Zero | Same bearing |
| 10 | Turn left | Positive | Further away |
| 01 | Turn right | Negative | Closer |
| 11 | Turn left and turn right | Negative (number is greater than the cost for the 01 qubit) | |

In some embodiments, the system may choose 01 qubit at block 210, and the iteration may adjust the flight trajectory (e.g., via controls) accordingly. As another example, for edge conditions, when heading directly at the target, both 10 and 01 qubits may result in positive costs, so the 00 qubit may be the most optimal choice for such instance.

As yet another example, for edge conditions, when heading away from the target/destination, both 10 and 01 qubits may result in identical, negative costs. In such instance, the system may choose either qubit.

In some embodiments, additional and/or different qubit semantic schemes may be applied and similarly minimized in order to determine the lowest cost based on repulsion and/or other dynamics such as aircraft speed, altitude, and the like.

It should be understood that, in some embodiments, the minimization may produce results which include activated, yet semantically exclusive qubits. Thus, in some instances, techniques for choosing a single qubit may be implemented. Using the above example, if the optimization (e.g., determining the lowest cost) resulted in the system selecting a 11 qubit, the system may be configured to automatically choose (e.g., randomly) between 10 or 01. In some embodiments, while a certain qubit, such as 00, may seem like the optimal choice, the system may not pick that qubit due to one or more additional considerations; for example the 00 qubit may result in the aircraft moving further away when heading directly away from the target/destination, so the system may be configured to automatically, in such instances, select another qubit instead.

In some embodiments, the system may be configured using one or more qubit semantic schemes to allow for different granularities of effect. As one example, if an aircraft is allowed to take a certain number of possible turning values A (where A is an integer), and the turning values can be arranged in increasing angles, the result may be a 2A qubit: A qubits for left and A qubits for right. For example, the system may be a 12-qubit system, as shown in Table 3 below. In the example shown in Table 3 below, the aircraft may have an affinity that favors a set of qubits, based on data regarding the aircraft's position and heading with respect to the target/destination. As shown, the right turning values may result in the aircraft heading directly to the target, whereas the left may not. With such an affinity, the system may associate and use only one or more first qubits. In some embodiments, the system may exclude the use of one or more second qubits. For example, the system may use only turn-right qubits and not turn-left qubits, as shown in Table 3, in the optimization process.

TABLE 3

Example cost and associated meaning for a 12-qubit system

| Turn-Left Qubit | Turn-Right Qubit | Cost | Cost Meaning |
| --- | --- | --- | --- |
| 000000 | 000000 | Zero | Same bearing |
| >0 | 000000 | Positive | Further away |
| 000000 | 100000 | Negative (but not the minimum cost qubit) | |
| 000000 | 110000 | More negative | |
| 000000 | 111000 | Optimal individual qubit cost, but not the most negative | Aircraft heading at the destination/target |
| 000000 | 111100 | Most negative cost (because all right-turn angles are better than current heading) | |
| 000000 | 111110 | A less-negative cost (angle worse than current heading) | |

As shown in Tables 2 and 3, the level of granularity can impact the cost and its cost meaning. A larger number of qubits (Table 3) can lead to multiple negative costs, for example.

In some embodiments, one or more qubit exclusivity constraints may be declared explicitly by one or more inputs entered to the system by a user. For example, a user may execute one or more inputs to the system that indicate that two or more qubits are mutually exclusive amongst one another, and the system may account for that declared exclusivity when performing a minimization. In some embodiments, a user at a classical computing system may execute an input indicating one or more qubit exclusivity constraints, and those constraints may be transmitted to the quantum computing system to be applied during the execution of the minimization operation by the quantum computing system. In some embodiments, minimization constraints may be declared in the interface of the decomposing solver (e.g., Qbsolv) and may be transmitted to the quantum computing system to be applied during the minimization operation.

In some embodiments, the system may be configured to consider other factors such as flight envelope, altitude, and weather conditions (e.g., wind) in determining the lowest cost energy option.

Exemplary Vector Field Zones

In some embodiments, such as endeavoring to land aircraft along a linear runway at an airport, it is required that aircraft approach the target location of the runway from a particular heading, rather than approaching from any direction. In order to achieve optimizations that result in this effect, one solution is to configure the path planning system 106 to implement spatially-defined zones around the target/destination (e.g., target runway) in order to selectively augment aircraft behavior in a spatially dependent manner and funnel aircraft toward the target location along a desired heading.

In some embodiments, the path planning system 106 may be configured to define one or more spatially zones in which different constraints or augmentations are applied to the maneuverability options of aircraft in those zones. In this way, a zone may be defined at an approach end of a runway that "attracts" aircraft in that zone by discouraging them from steering away from the runway, while a zone may be defined at a non-approach end of a runway that "repels" aircraft in that zone by encouraging them to steer away from the runway and discouraging them from steering toward the runway. This encouragement and discouragement of travel in certain directions may be achieved by modifying the maneuverability options for aircraft in those zones to give them more options to travel in a desired direction and fewer options to travel in an undesired direction. Thus, the zones may effectively form a vector field around the airport that apply as attractor within the algorithm to encourage/discourage particular headings in different zones.

In some embodiments, the constraint(s) in the spatial zones can be used to implement constraints/modifications to aircraft dynamics including cruise speed, turning rate, and climbing speed, as well as to implement constraints/modifications to aircraft separation requirements. In some embodiments, the one or more constraints/modifications can be defined by the classic computing system at block 204 (of FIG. 2).

Figure 3A:
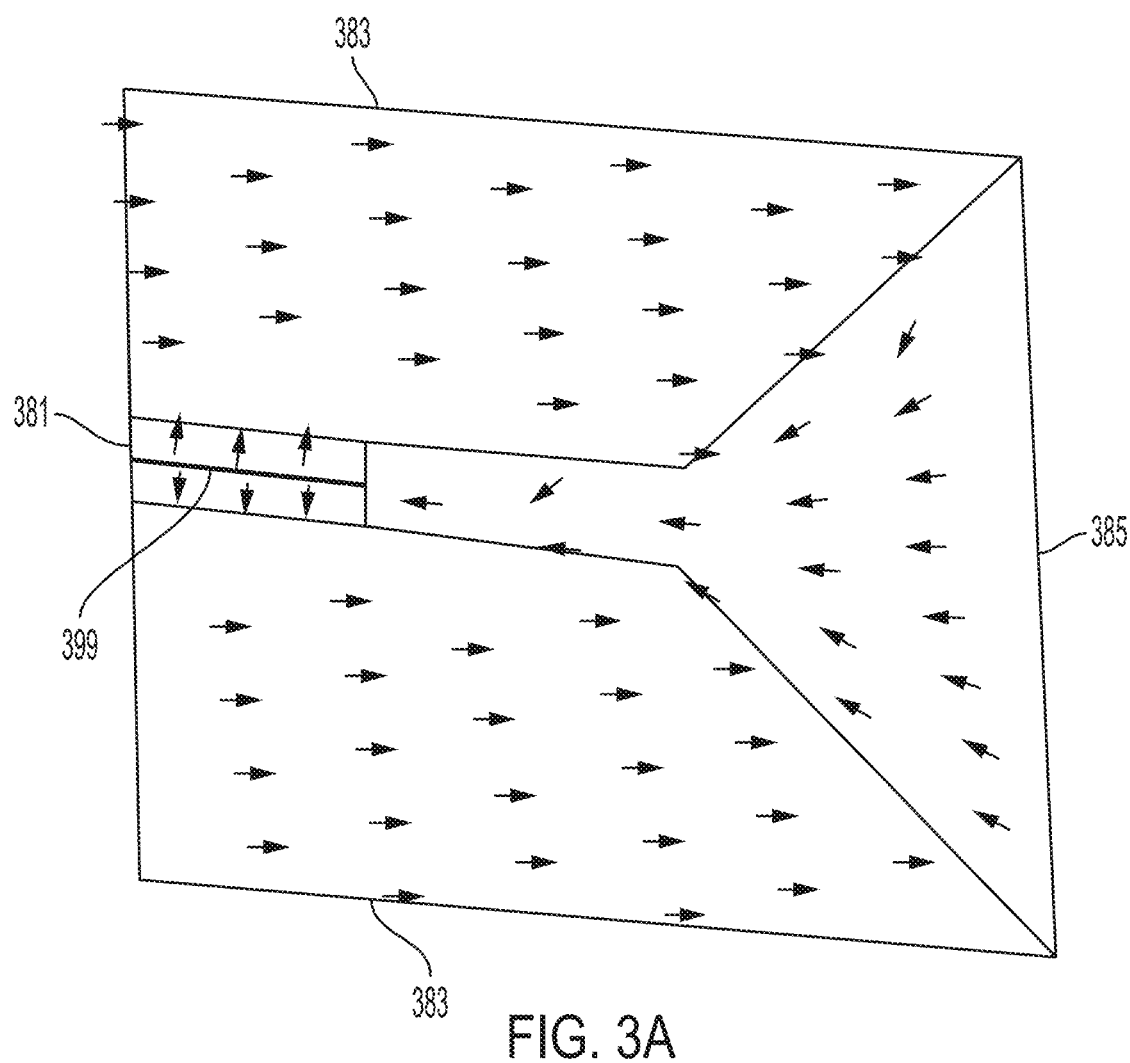
FIG. 3A depicts exemplary zones, in accordance with some embodiments.

FIG. 3A illustrates exemplary vector field zones showing how aircraft may be funneled toward an approach end of a runway 399 and away from a non-approach end of a runway 399, in accordance with some embodiments. As shown, areas proximate to runway 399 can be separated into a plurality of zones, such as a first zones 381 that repel aircraft laterally away from runway 399, second zones 383 that push aircraft back toward an approach area, and a third zone 385 that funnels aircraft toward an approach end of runway 399.

In some embodiments, the spatial constraints can be different for different zones, defining effective vector fields that "push" aircraft in different directions and with different intensities. Intensity of the effect of a zone may be defined by the severity with which maneuverability options are constrained or augmented. In some embodiments, a zone may be defined to add no additional constraints or augmentation to aircraft behavior.

Although FIG. 3A shows three zones that collectively form a square, in some embodiments, the path planning system 106 may create any number of zones greater than or equal to one. Additionally, the zones may collectively form any shape or pattern, may have any size, and may have any configuration. The properties of the zone(s) may be based on factors including, but not limited to, the origins of aircraft, holding patterns, and the number of aircraft attempting to use the common path at the same time. In some embodiments, the properties of the zone(s) may be determined in real-time and may change as the locations of aircraft change.

Figure 3B:
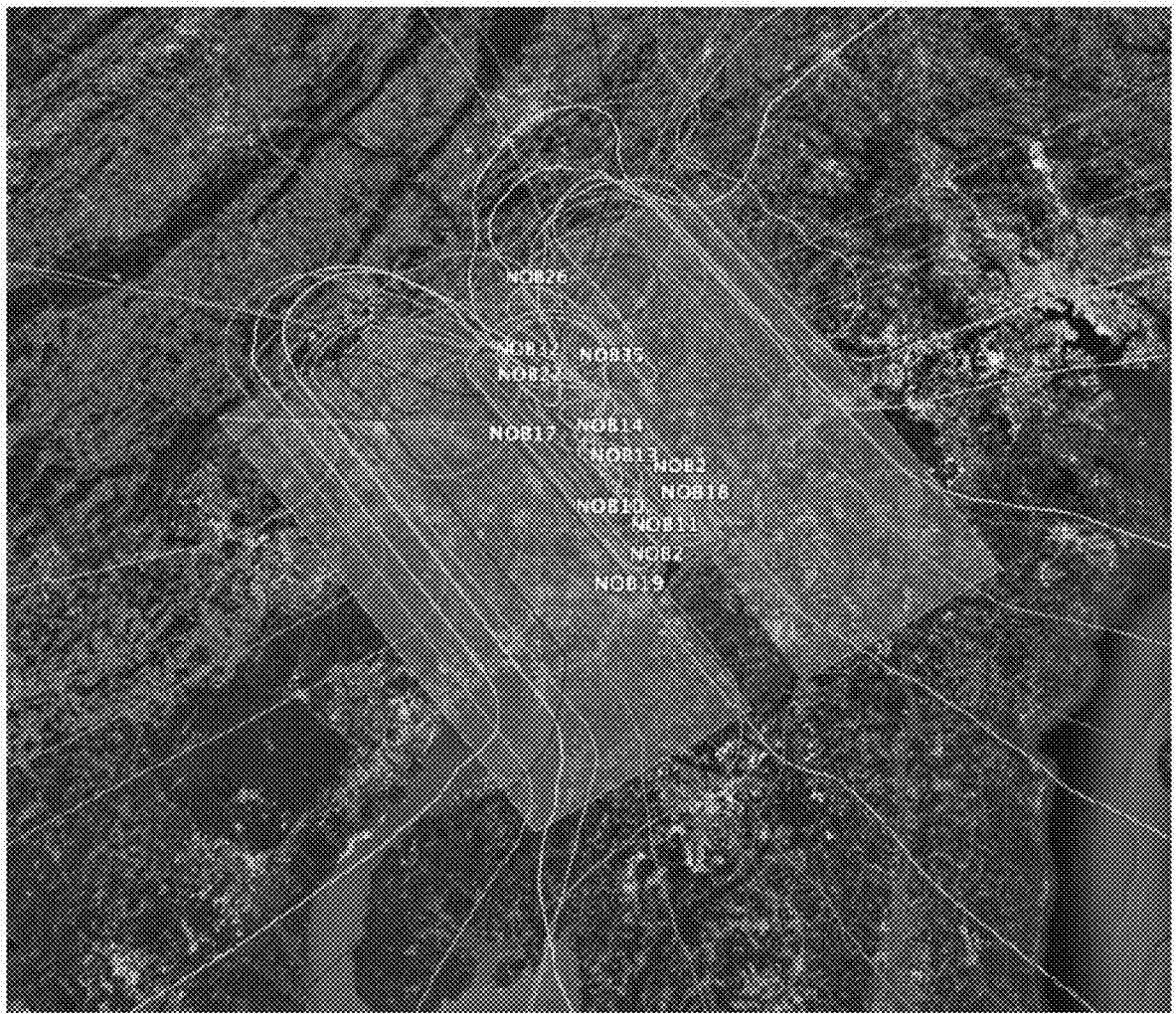
FIGS. 3B-3D depict aircraft paths calculated in accordance with exemplary systems and zones as described herein.
Figure 3C:
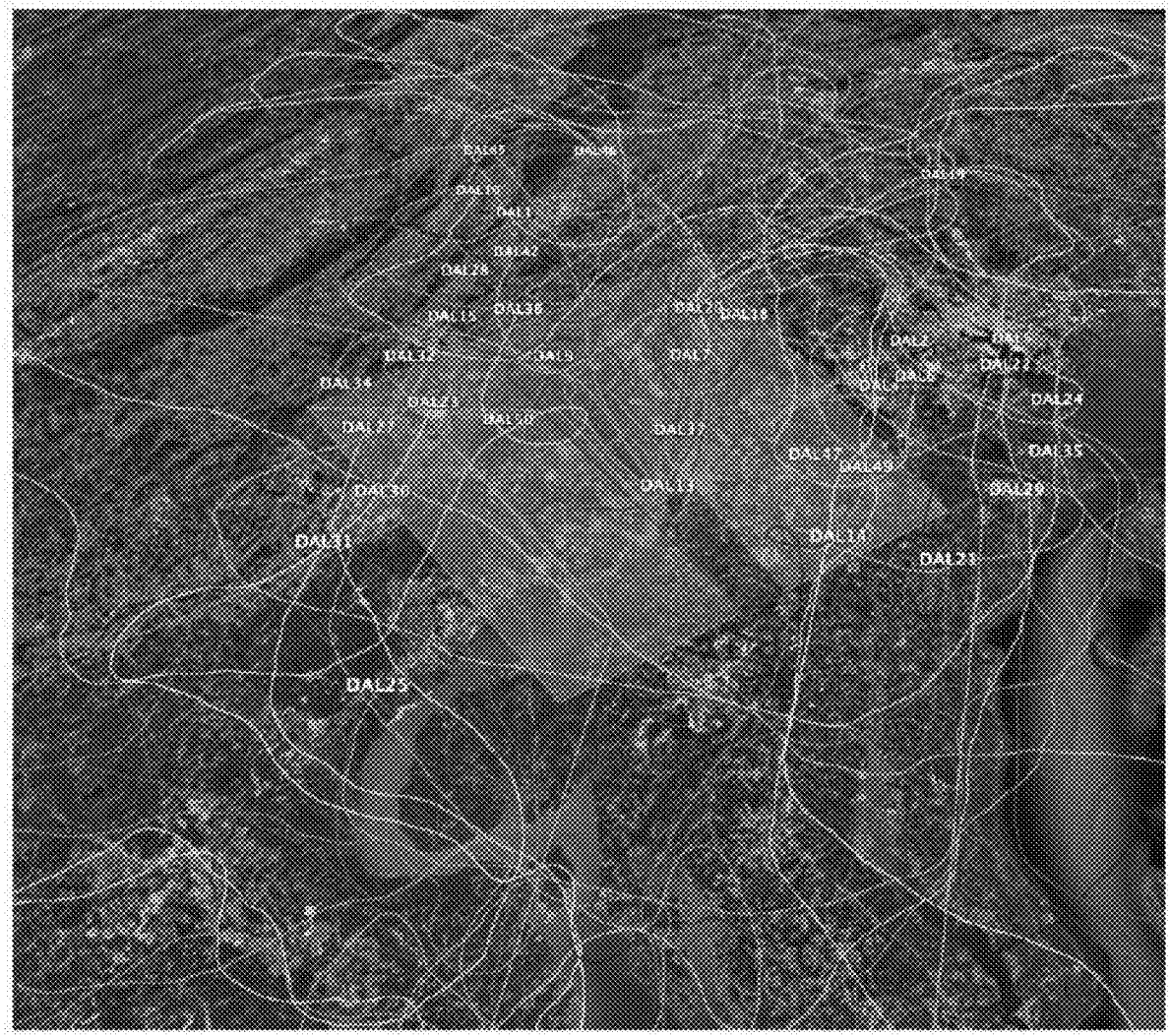
Figure 3D:

FIGS. 3B-3D show two examples of aircraft landing paths calculated by a system in accordance with the disclosure herein and using a similar set of vector field zones as those shown in FIG. 3A.

In FIG. 3B, it can be seen that landing numerous aircraft from different origins produced patterns akin to Standard Terminal Arrival Routes (STARS). Note that, unlike STARS, the landing patterns calculated are not created by predefined routes, but by area constraints and the underlying aircraft dynamics. Also note the appearance of holding patterns. These holding patterns were created when multiple aircraft attempted to land simultaneously. Due to their separation constraints, only one aircraft was be able to land at a time; the others were forced off their landing approaches to reattempt to land, perhaps multiple times. These constraints provide a reasonable proxy for historical operations at the airport (KIAD) on which this calculation was modeled.

In FIG. 3C, it can be seen that increasing the separation requirements or adding aircraft past a critical threshold quantity for the airspace may create chaotic patterns. Here, the repulsive forces coupled with the airport constraints prevented aircraft from effectively establishing final approach.

In some embodiments, vector field zones may be defined in accordance with any geographic and/or meteorological considerations. For example vector field zones may be implemented to prevent aircraft from entering certain countries, states, military areas, or any no-fly zones. In some embodiments, vector field zones may be implemented to cause aircraft to avoid storms or other weather patterns. In the example of FIG. 3D, it is shown how aircraft paths were calculated in order to avoid weather patterns while approaching a target runway.

Aircraft Types

Embodiments of the disclosure further include implementing other types of constraints such as those shown in Table 4. For example, high-mobility UAVs may interact and have behaviors different from conventional aircraft due to the greater degrees of freedom with a UAV. The path planning system 106 can add constraints associated with aircraft type to handle such situations. In some embodiments, system 106 may model different kinds of aircraft according to their different flight capabilities, which may for example enable modeling omni-directional maneuverability capabilities of small UAV's (as opposed to the more limited steering/turning capabilities of large fixed-wing aircraft).

TABLE 4

Example constraints

| Aircraft type | Bounds | Property | Value |
|---|---|---|---|
| Conventional | Min | Cruise speed | 200 kn |
| Conventional | Norm | Cruise speed | 220 kn |
| Conventional | Max | Cruise speed | 250 kn |
| Conventional | Min | Descent speed | 90 kn |
| Conventional | Norm | Descent speed | 120 kn |
| Conventional | Max | Descent speed | 140 kn |
| Conventional | Min | Separation | 5 nm |
| Conventional | Max | Turning rate | 3 degrees/sec. |
| Conventional | Max | Descent | 2500 ft./min. |
| UAV | Min | Speed | 0 kn |
| UAV | Cruise | Speed | 13 kn |
| UAV | Max | Speed | 80 kn |
| UAV | Min | Separation | 600 ft. |
| UAV | Max | Turning rate | No |

In some embodiments, different spatial zones as contemplated in the previous section may be defined for different types of aircraft (e.g., for commercial aircraft, large aircraft, small aircraft, fixed-wing aircraft, military aircraft, fixed-wing aircraft, UAV's, etc.), or one or more zones may be configured to act upon different kinds of aircraft in a different manner (e.g., by constraining maneuverability options in different ways).

Exemplary Computing System

Figure 4:
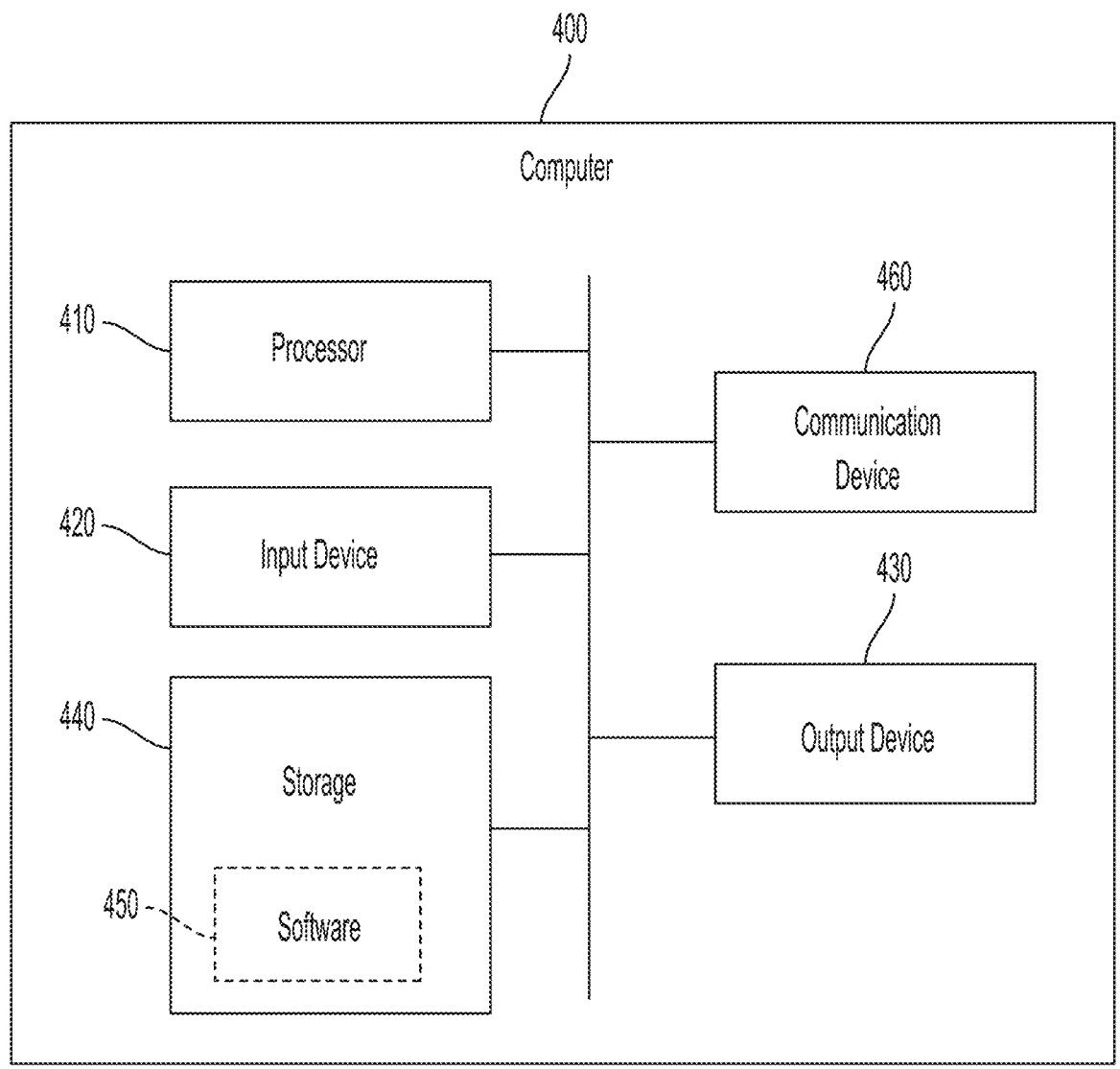
FIG. 4 illustrates an exemplary computing system used to optimize aircraft path planning, in accordance with some embodiments.

FIG. 4 illustrates an exemplary computing system, in accordance with some embodiments. Computing system 400 can be a component of a system for optimizing air traffic control using system 100 and/or any of its subcomponents described above with respect to FIG. 1. In some embodiments, computing system 400 may be configured to execute a method for optimizing cooperative actions among heterogeneous autonomous connected machines, such as all or part of method 200 described above with respect to FIG. 2.

Computing system 400 can include a host computer connected to a network. Computing system 400 can be a client computer or a server. As shown in FIG. 4, computing system 400 can be any suitable type of microprocessor-based device, such as a personal computer; workstation; server; or handheld computing device, such as a phone or tablet. The computer can include, for example, one or more of processor 410, input device 420, output device 430, storage 440, and communication device 460.

Input device 420 can be any suitable device that provides input, such as a touch screen or monitor, keyboard, mouse, or voice-recognition device. Output device 430 can be any suitable device that provides output, such as a touch screen, monitor, printer, disk drive, or speaker.

Storage 440 can be any suitable device that provides storage, such as an electrical, magnetic, or optical memory, including a RAM, cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein, such as all or part of method 200 described above with respect to FIG. 2.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can be implemented and executed on a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computing system 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Additionally, those skilled in the art would understand that one or more (e.g., all) of the above described components and features may be combined without departing from the scope of the disclosure. Finally, the entire disclosure of the patents and publications referred to in this application are hereby incorporated herein by reference.

The invention claimed is:

1. A quantum-computing aircraft path planning system, the system comprising a classical computing system and a quantum computing system communicatively coupled to one another,
  the classical computing system configured to:
    receive state data from a plurality of aircraft, the state data specifying position data and heading data for each of the plurality of aircraft;
    generate one or more respective first groups of mutually exclusive maneuverability options for each of the plurality of aircraft;
    partition a plurality of qubits of the quantum computing system between the plurality of aircraft based on the one or more respective first groups of mutually exclusive maneuverability options for each of the plurality of aircraft, wherein each qubit partitioned to an aircraft of the plurality of aircraft represents a maneuverability option of the one or more respective first groups of mutually exclusive maneuverability options; and
  the quantum computing system configured to generate a first solution representing, for each of the one or more respective first groups of mutually exclusive maneuverability options for each of the plurality of aircraft, a respective lowest-cost first maneuverability option for the respective aircraft.

2. The system of claim 1, wherein the classical computing system is configured to:
  calculate, based on the state data, a first respective distance to a target for each of the plurality of aircraft; and
  calculate, based on the state data, a first respective inter-aircraft repulsion for each of the plurality of aircraft,
  wherein the one or more respective first groups of mutually exclusive maneuverability options are generated based on the first respective distance to the target for each of the plurality of aircraft and based on the first respective inter-aircraft repulsion for each of the plurality of aircraft.

3. The system of claim 2, wherein:
  the classical computing system is configured to:
  calculate, based at least in part on the respective lowest-cost first maneuverability option for each of the plurality of aircraft, a second respective distance to target for each of the plurality of aircraft and a second respective inter-craft repulsion for each of the plurality of aircraft, wherein the second respective distances to target and second respective inter-craft repulsions represent a subsequent time-step with respect to the first respective distance to target and first respective inter-craft repulsion; and
  generate one or more respective second groups of mutually exclusive maneuverability options for each of the plurality of respective aircraft, wherein the one or more respective second groups of mutually exclusive maneuverability options are generated based on the second respective distance to the target for each of the plurality of aircraft and based on the second respective inter-aircraft repulsion for each of the plurality of aircraft; and
  the quantum computing system is configured to generate a second solution representing, for each of the one or more respective second groups of mutually exclusive maneuverability options for each of the plurality of aircraft, a respective lowest-cost second maneuverability option for the respective aircraft.

4. The system of claim 1, wherein the one or more respective first groups of mutually exclusive maneuverability options include data representing a quadratic unconstrained binary optimization, the data representing the quadratic unconstrained binary optimization including a plurality of matrices.

5. The system of claim 4, wherein the data representing the quadratic unconstrained binary optimization comprises a plurality of total distances-to-target.

6. The system of claim 5, wherein each of the plurality of total distances-to-target is equal to a sum of a distance-to-target for each of the plurality of aircraft for a given group of mutually exclusive qubits.

7. The system of claim 4, wherein the data representing the quadratic unconstrained binary optimization comprises a plurality of total intercraft-repulsion costs.

8. The system of claim 7, wherein each of the plurality of total intercraft-repulsion costs is equal to a sum of an intercraft repulsion cost for each of the plurality of aircraft for a given group of mutually exclusive qubits.

9. The system of claim 1, wherein the path planning system is configured to transmit a control signal, from a control system to one or more of the plurality of aircraft, the control signal comprising instructions for navigation of the one or more of the plurality of aircraft based on the first solution.

10. The system of claim 1, wherein the classical computing system is configured to transmit the one or more groups of mutually exclusive maneuverability options to the quantum computing system, and
the quantum computing system is configured to transmit the generated solution to the classical computing system.

11. The system of claim 1, wherein the one or more respective first groups of maneuverability options represent one or more of: a change in direction, a change in speed, and a change in altitude.

12. The system of claim 1, wherein the generating the one or more respective first groups of maneuverability options comprises:
determining a zone for the respective aircraft based on the state data; and
generating the one or more groups of respective first maneuverability options in accordance with one or more maneuverability option constraints applicable to the determined zone.

13. A method for optimizing aircraft control, the method comprising:
communicatively coupling a classing computing system and a quantum computing system to one another;
at the classical computing system:
receiving state data from a plurality of aircraft, the state data specifying position data and heading data for each of the plurality of aircraft;
generating one or more respective first groups of mutually exclusive maneuverability options for each of the plurality of aircraft;
partitioning a plurality of qubits of the quantum computing system between the plurality of aircraft based on the one or more respective first groups of mutually exclusive maneuverability options for each of the plurality of aircraft, wherein each qubit partitioned to an aircraft of the plurality of aircraft represents a maneuverability option of the one or more respective first groups of mutually exclusive maneuverability options;
at the quantum computing system, generating a first solution representing, for each of the one or more respective first groups of mutually exclusive maneuverability options for each of the plurality of aircraft, a respective lowest-cost first maneuverability option for the respective aircraft.

14. The method of claim 13, further comprising:
at the classical computing system:
calculating, based on the state data, a first respective distance to a target for each of the plurality of aircraft; and
calculating, based on the state data, a first respective an inter-aircraft repulsion for each of the plurality of aircraft,
wherein the one or more respective first groups of mutually exclusive maneuverability options are generated based on the first respective distance to the target for each of the plurality of aircraft and based on the first respective inter-aircraft repulsion for each of the plurality of aircraft.

15. The method of claim 14, further comprising:
at the classical computing system:
calculating, based at least in part on the respective lowest-cost first maneuverability option for each of the plurality of aircraft, a second respective distance to target for each of the plurality of aircraft and a second respective inter-craft repulsion for each of the plurality of aircraft, wherein the second respective distances to target and second respective inter-craft repulsions represent a subsequent time-step with respect to the first respective distance to target and first respective inter-craft repulsion; and
generating one or more respective second groups of mutually exclusive maneuverability options for each of the plurality of respective aircraft, wherein the one or more respective second groups of mutually exclusive maneuverability options are generated based on the second respective distance to the target for each of the plurality of aircraft and based on the second respective inter-aircraft repulsion for each of the plurality of aircraft; and
at the quantum computing system, generating a second solution representing, for each of the one or more respective second groups of mutually exclusive maneuverability options for each of the plurality of aircraft, a respective lowest-cost second maneuverability option for the respective aircraft.

16. The method of claim 13, wherein the one or more respective first groups of mutually exclusive maneuverability options include data representing a quadratic unconstrained binary optimization, the data representing the quadratic unconstrained binary optimization including a plurality of matrices.

17. The method of claim 13, further comprising:
at the classical computing system, transmitting the one or more groups of mutually exclusive maneuverability options to the quantum computing system; and
at the quantum computing system, transmitting the generated solution to the classical computing system.

18. The method of claim 13, wherein the one or more respective first groups of maneuverability options represent one or more of: a change in direction, a change in speed, and a change in altitude.

19. The method of claim 13, wherein the generating the one or more groups of maneuverability options comprises:
  determining a zone for the respective aircraft based on the state data; and
  generating the one or more groups of respective first maneuverability options in accordance with one or more maneuverability option constraints applicable to the respective aircraft within the determined zone.

20. A non-transitory computer-readable storage medium for optimizing aircraft control, wherein the storage medium stores instructions that, when executed by one or more processors of a quantum-computing aircraft path planning system, cause the quantum-computing aircraft path planning system to:
  communicatively couple a classical computing and a quantum computing system to one another;
  at the classical computing system:
    receive state data from a plurality of aircraft, the state data specifying position data and heading data for each of the plurality of aircraft;
    generate one or more respective first groups of mutually exclusive maneuverability options for each of the plurality of aircraft;
    partition a plurality of qubits of the quantum computing system between the plurality of aircraft based on the one or more respective first groups of mutually exclusive maneuverability options for each of the plurality of aircraft, wherein each qubit partitioned to an aircraft of the plurality of aircraft represents a maneuverability option of the one or more respective first groups of mutually exclusive maneuverability options; and
  at the quantum computing system, generate a first solution representing, for each of the one or more respective first groups of mutually exclusive maneuverability options for each of the plurality of aircraft, a respective lowest-cost first maneuverability option for the respective aircraft.

* * * * *